L. HESS.
BEER FAUCET.
APPLICATION FILED APR. 25, 1912.
1,047,410.
Patented Dec. 17, 1912.
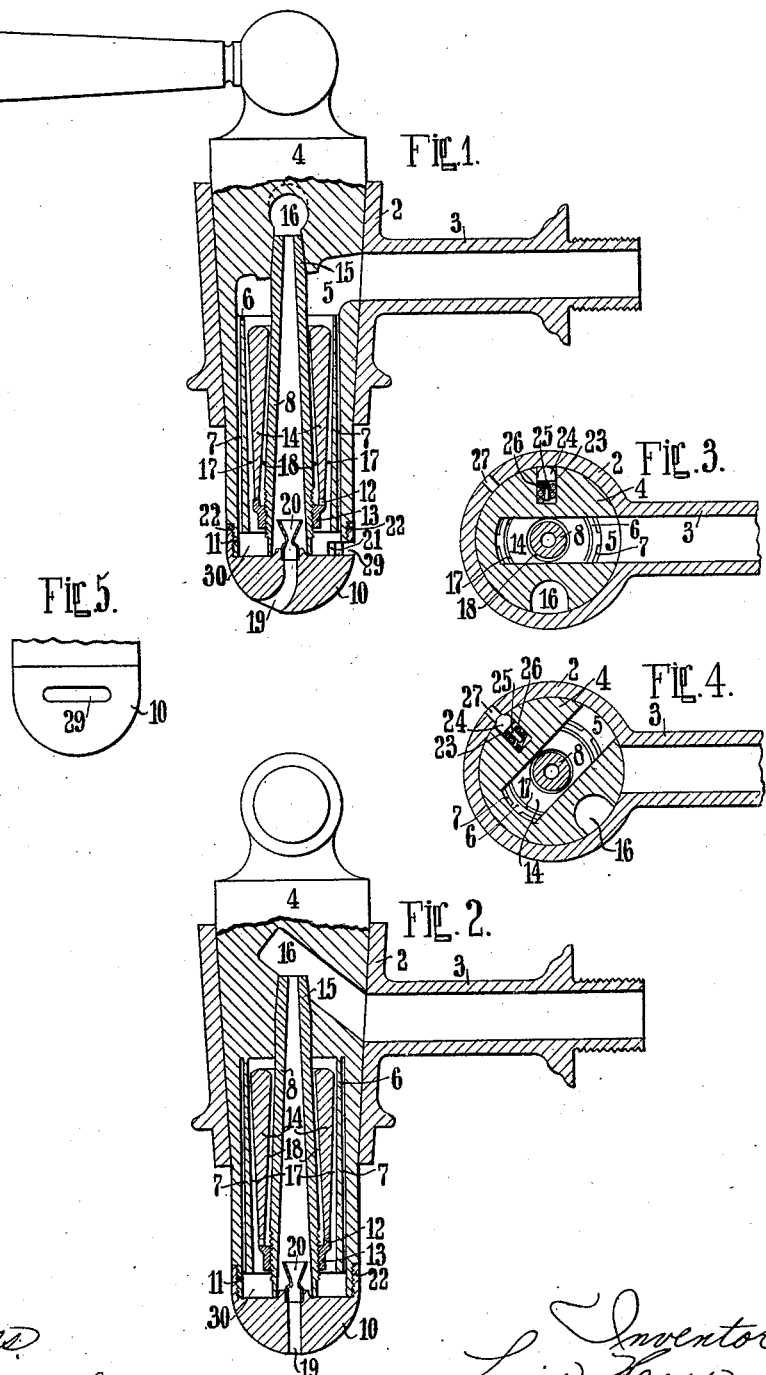

UNITED STATES PATENT OFFICE.

LOUIS HESS, OF DARMSTADT, GERMANY.

BEER-FAUCET.

1,047,410.  Specification of Letters Patent.  Patented Dec. 17, 1912.

Application filed April 25, 1912. Serial No. 693,210.

*To all whom it may concern:*

Be it known that I, LOUIS HESS, a citizen of the Empire of Germany, and residing at Darmstadt, Germany, have invented certain new and useful Improvements in Beer-Faucets, of which the following is a specification.

My invention relates to faucets for tapping beer, and a primary object is to provide an improved beer-faucet which enables beer not only to pass without foam into a glass, pitcher or other vessel, and fill the same to any desired height, but also to be supplied in the form of froth or foam. The foamless discharge of the beer into the vessel is brought about by the beer being led between annular members having intervening narrow spaces for the passage of the beer, so that the beer has to overcome great frictional resistance between the walls of the annular members whereby the pressure of the beer becomes gradually reduced, while foaming is caused in my improved faucet owing to the beer passing through a bell-mouthed nozzle and then entering an outlet duct, where air cannot mix with the issuing liquid, but only carbonic acid bubbles can be formed.

One illustrative embodiment of my invention is represented by way of example in the accompanying drawing, wherein:—

Figure 1 is a longitudinal section, and Fig. 2 a similar section with the spigot in another position; Figs. 3 and 4 are horizontal sections through the faucet with the spigot in different positions, and Fig. 5 is a side elevation of the bottom of the spigot.

Referring to the drawing, the faucet comprises a casing 2 having a branch pipe 3 and containing the rotatable spigot 4. This spigot has a bore 5 constituting a chamber and contains a concentric tube-like member 6 so arranged that an annular space 7 is formed between it and the spigot. In the space surrounded by this member 6 is arranged the upwardly tapering, concentric, hollow cone 8. The bottom of the cone 8 rests on the cap 10 of the spigot, the cylindrical portion 22 of said cap being screwed over the reduced portion 11 of the spigot 4. A nut 13 having lugs 12 is screwed onto the lower end of the cone 8 and supports a second tube-like member 14 in such a manner that between the two members 14 and 6, as well as between the member 14 and the cone 8 the annular spaces 17 and 18 are respectively formed and serve as channels for the beer. The cone 8 opens above into a duct 16 forming therewith a chamber which, in the position of the spigot shown in Fig. 2, is connected with the inlet pipe 3. The cap 10 has within it a duct 19 which constitutes an outlet for the foamed beer and opens inwardly into a bell-mouthed nozzle 20, whose section at the constricted portion is about 1/50 of the section of the inlet pipe. The reduced portion 11 of the spigot, as well as the cylindrical portion 22 of the cap 10 is provided with a slot 21, 29, respectively, as an outlet for the beer. The spigot 4 is also provided with a bore 23 (Figs. 3 and 4) containing a pin 25 having a head 24 which is pressed toward the casing 2 by means of a spring 26. A hole 27 in the casing is adapted to receive a portion of said head 24 and in this manner the spigot 4 is secured when it is turned into the "closed" position, as shown in Fig. 4.

In order to tap the beer the spigot is first of all turned into the position illustrated in Figs. 1 and 3. The consequence is that the beer entering from the pipe 3 passes into the annular chambers or spaces 7, 17, 18, flows through these with gradually reduced pressure into the space 30 whence it runs through the slot 29 into the vessel held below. Before this vessel is quite full, the spigot is turned into the position shown in Fig. 2. The beer then flows through the cone 8 and enters the bell-mouthed nozzle 20. Beyond the constricted portion of the same, the passage therein is enlarged to be of the same section as the duct 19, and the beer therefore enters the duct at a high speed and consequently with a small pressure, in consequence of which the carbonic acid is liberated, which causes the beer to foam. Since air is quickly discharged from the duct 19 by the passage of the beer, the foam so formed contains only the gas absorbed in the beer, *i. e.* carbonic acid gas. The foamed beer flowing from the duct 19 then produces the desired covering of froth on the beer previously discharged.

I claim:—

1. In a beer faucet, the combination with a casing having a branch pipe, a spigot rotatable in the casing and having two separate chambers, each chamber having an inlet adapted to be connected with said pipe, the one chamber having an outlet duct and the other an outlet, a nozzle mounted in the spigot between the former chamber and its outlet duct, and one or more members dividing the latter chamber into narrow passages located between the members and the walls of the latter chamber and connecting the inlet of the latter chamber with the outlet thereof.

2. In a beer faucet, the combination with a casing having a branch pipe, a spigot rotatable in the casing and having a larger and a smaller chamber, each chamber having an inlet adapted to be connected with said pipe, the smaller chamber having an outlet duct and the larger an outlet, the larger chamber being an annular chamber concentrically surrounding the smaller one, a nozzle mounted in the spigot between the smaller chamber and its outlet duct, and a plurality of concentric, tubular members dividing the larger chamber into narrow annular passages located between the members and the walls of the larger chamber and connecting the inlet of the larger chamber with the outlet thereof.

3. In a beer faucet, the combination with a casing having a branch pipe, a spigot rotatable in the casing and having a larger and a smaller chamber, each chamber having an inlet adapted to be connected with said pipe, the smaller chamber having an outlet duct and the larger an outlet slot, said duct and said slot opening in opposite directions, a nozzle mounted in the spigot between the smaller chamber and its outlet duct, and a plurality of concentric, tubular members dividing the larger chamber into narrow annular passages located between the members and the walls of the larger chamber and connecting the inlet of the larger chamber with the outlet thereof.

In testimony whereof, I affix my signature in the presence of two witnesses.

LOUIS HESS.

Witnesses:
ELSA HESS, GEB. BUHF,
JEAN GRUND.

Copies of this patent may be obtained for five cents each, by addressing the "Commissioner of Patents, Washington, D. C."